(12) United States Patent
Muth

(10) Patent No.: US 7,708,131 B2
(45) Date of Patent: May 4, 2010

(54) SWING AUGER HOPPER DRIVE

(76) Inventor: Gordon Muth, R.R. #1, Box 1031, Sylvan Lake, Alberta (CA) T4S 1X6

(\*) Notice: Subject to any disclaimer, the term of this patent is extended or adjusted under 35 U.S.C. 154(b) by 0 days.

(21) Appl. No.: 12/202,653

(22) Filed: Sep. 2, 2008

(65) Prior Publication Data

US 2010/0051414 A1    Mar. 4, 2010

(51) Int. Cl.
*B65G 21/10* (2006.01)
(52) U.S. Cl. .................... 198/315; 198/312; 198/589; 198/666; 198/668
(58) Field of Classification Search .............. 198/312, 198/314, 315, 589, 666, 667, 668
See application file for complete search history.

(56) References Cited

U.S. PATENT DOCUMENTS

| | | | | |
|---|---|---|---|---|
| 4,603,775 A | * | 8/1986 | Plett ........................... | 198/589 |
| 4,963,066 A | * | 10/1990 | Boppart ...................... | 414/376 |
| 5,230,419 A | * | 7/1993 | Millard ........................ | 198/668 |
| 5,305,866 A | * | 4/1994 | Stewart et al. .............. | 198/311 |
| 5,746,303 A | * | 5/1998 | Niewold ...................... | 198/660 |
| 6,068,103 A | * | 5/2000 | Werner ........................ | 198/311 |
| 6,120,233 A | * | 9/2000 | Adam .......................... | 414/502 |
| 7,191,889 B1 | * | 3/2007 | Heley .......................... | 198/315 |
| 7,428,956 B2 | * | 9/2008 | Scherman ................... | 198/312 |
| 7,488,149 B2 | * | 2/2009 | Waldner ...................... | 414/532 |
| 7,552,818 B2 | * | 6/2009 | Makinen et al. ........... | 198/861.2 |

\* cited by examiner

*Primary Examiner*—Douglas A Hess
(74) *Attorney, Agent, or Firm*—Adrian D. Battison; Ade & Company Inc.

(57) ABSTRACT

A remote control drive kit for attachment to the hopper of a swing auger for driving movement of the hopper relative to the main auger includes a first drive assembly mounted on the base wall of the hopper adjacent a front edge and a second drive assembly mounted on the base wall adjacent a rear edge. Each drive assembly is mounted approximately midway across the base wall and includes a pair of drive wheels and a separate motor and is carried on a bracket arrangement which allows adjustment in a direction toward and away form the edge to accommodate different types of hopper.

9 Claims, 3 Drawing Sheets

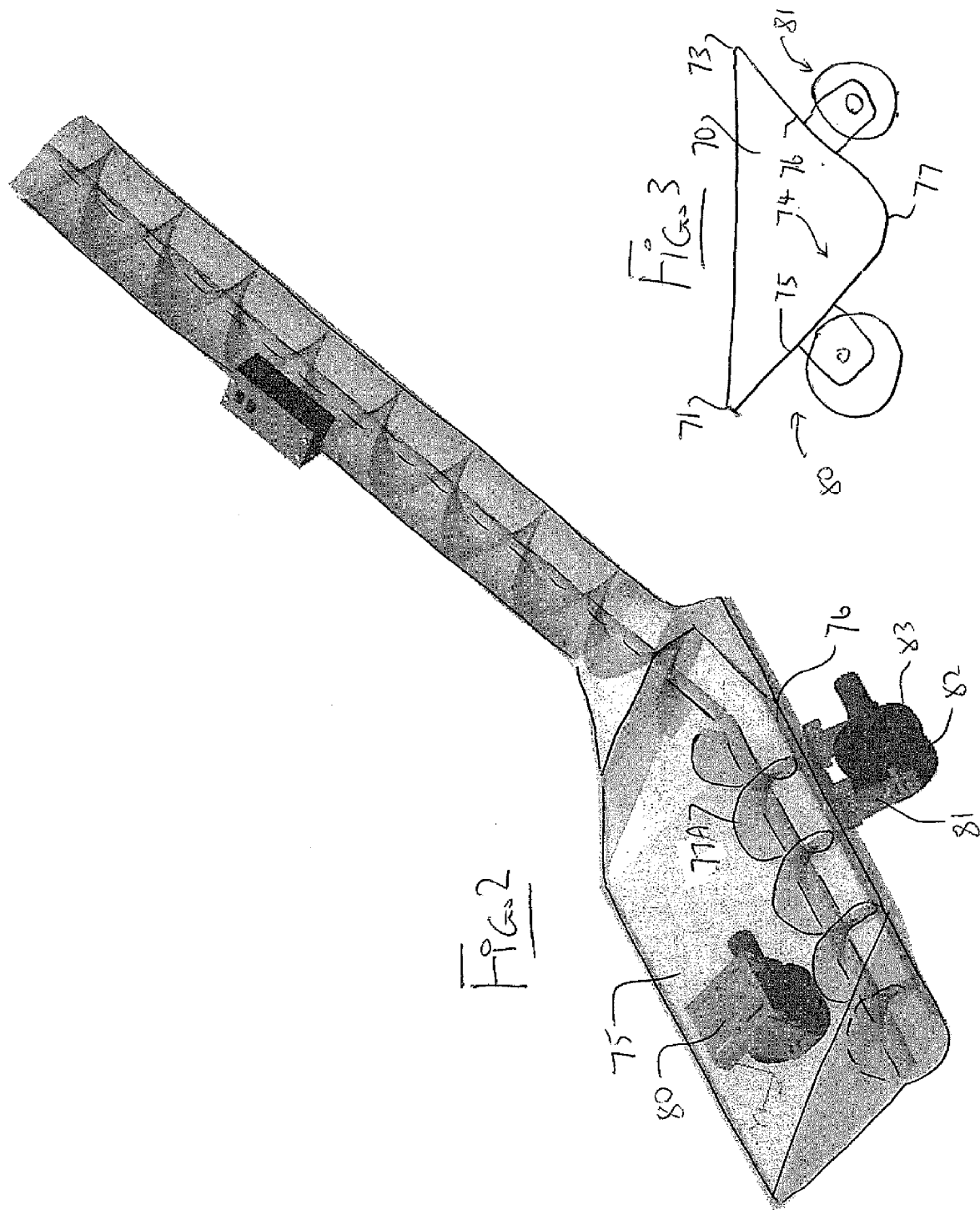

SWING AUGER HOPPER DRIVE

This invention relates to a swing auger of the type where a secondary auger attached adjacent a bottom end of a main auger to feed the main auger includes a hopper which can swing from a retracted position along side the main auger.

BACKGROUND OF THE INVENTION

Swing augers have been in use for years. Conventional swing augers are attachable to main auger which is well known in the art. One of the main problems with conventional swing augers is that they are heavy and difficult to manually manipulate. The swing auger includes an auger tube pivoted at the upper end to the main auger with a hopper at the lower end of the swing auger tube.

Recently, hydraulically powered swing augers such as the MK POWER SWING manufactured by WESTFIELD in Rosenort, Manitoba utilize hydraulic power from the tractor to drive an auxiliary wheel or wheels attached to the swing auger tube at a position just upward from the hopper. One of the problems with the hydraulically powered swing augers is that they require the tractor to be in operation to provide hydraulic pressure to the hydraulic motor. Another problem with hydraulically powered swing augers is that they require the user to manipulate a valve near the swing auger requiring the user to leave the tractor to move the swing auger. A similar arrangement is sold by a competitor Mayrath as a hydraulic drive kit for a swing away auger.

While these devices may be suitable for the particular purpose to which they address, they are not as suitable for efficiently manipulating a position of a swing auger. Conventional swing augers require the user to manually manipulate the swing auger into the desired positions.

In U.S. Pat. No. 7,191,889 ((Heley) issued Mar. 20, 2007 is disclosed a remote controlled swing auger system for efficiently manipulating a position of a swing auger. The remote controlled swing auger system includes a swing auger connectable to a main auger, a swing hopper connected to the swing auger, a plurality of front wheels and a plurality of rear wheels rotatably attached to the swing hopper, a drive motor mechanically connected to the front wheels, a control unit in communication with the drive motor, and at least one controller in communication with the control unit. The controller may be comprised of a manual controller and/or a remote controller. The user is able to pivot the swing hopper with respect to a main auger by using the remote controller while in the tractor or in a remote location away from the augers.

SUMMARY OF THE INVENTION

It is one object of the invention to provide an improved arrangement which can be provided as a kit for attachment to a hopper of the swing auger.

According to one aspect of the invention there is provided an auger assembly comprising:

a main auger;

a swing auger connected to the main auger for pivotal swing movement about a generally upstanding axis of the main auger so that the swing auger can swing from a retracted position along side the main auger to an extended position at right angles to the main auger;

a hopper connected to an outer end of said swing auger, the hopper having a pair of end walls and a base wall interconnecting the end walls and defining first and second side edges at right angles to the end walls;

and a drive kit for attachment to the hopper for driving movement of the hopper comprising:

a first drive assembly arranged for mounting on the base wall adjacent the first side edge of the hopper;

and a second drive assembly arranged for mounting on the base wall adjacent the second side edge of the hopper;

each drive assembly including at least one ground wheel and an electric drive motor for driving said at least one ground wheel about its axis so as to drive movement of the hopper.

Preferably each drive assembly includes a pair of drive wheels mounted for rotation about a common axis.

Preferably each drive assembly includes an adjustment allowing adjustment movement of the axis of the drive wheels in a direction toward and away from the respective side edge of the hopper.

Preferably the adjustment is provided by a mounting for the wheels and the drive motor which is movable relative to a bracket on the base of the hopper.

Preferably the mounting for the wheels and the drive motor comprises a pair of parallel mounting plates carrying bearings for the wheel and a support for the motor and wherein the bracket on the hopper is a channel in which the plates sit and along which the plates can be adjusted by selecting mounting holes.

Preferably there is provided a control unit in communication with said drive motors and a remote controller in communication with said control unit for controlling the operation of said drive motors.

Preferably there is only two drive assemblies each mounted in a respective side of a center line of the base of the hopper.

Preferably the base of the hopper includes two side wall portions converging downwardly and inwardly to an apex at the center line with the drive assemblies being adjustable on the side wall portions so as to move downwardly relative to the center line.

BRIEF DESCRIPTION OF THE DRAWINGS

One embodiment of the invention will now be described in conjunction with the accompanying drawings in which:

FIG. 2 is an isometric drawings partly in phantom showing just the swing auger of FIG. 1 and the addition of two drive assemblies of the present invention on the hopper.

FIG. 3 is an end elevational view of the hopper and drive assemblies of FIG. 2.

In the drawings like characters of reference indicate corresponding parts in the different figures.

DETAILED DESCRIPTION

Figure 1:
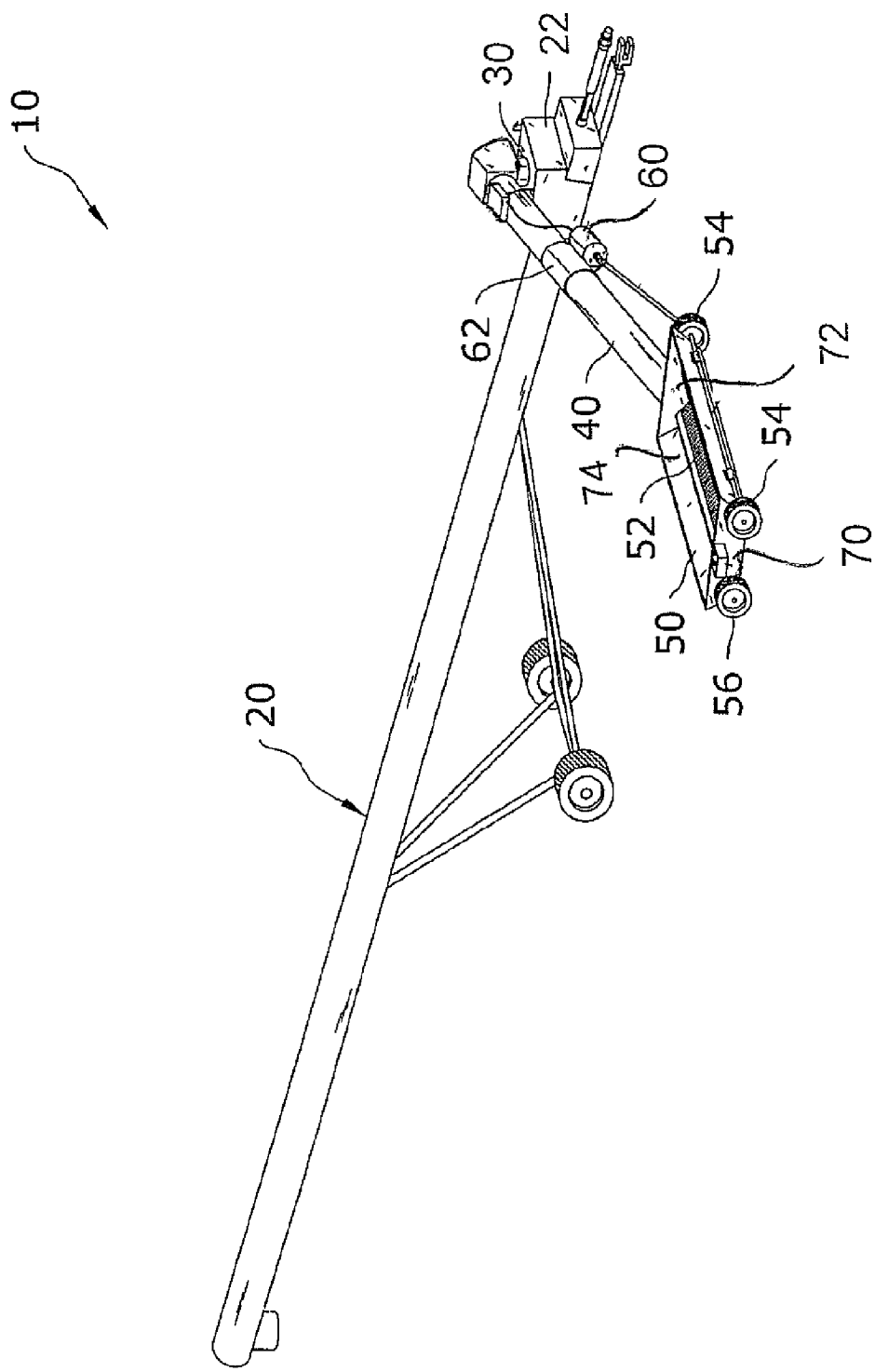
FIG. 1 is a drawing taken from the PRIOR ART showing a swing auger system including a driven hopper.

In FIG. 1 is shown a PRIOR ART arrangement of a remote controlled swing auger system 10, which comprises a swing auger 40 connected to a main auger 20, a swing hopper 50 connected to the swing auger 40, a plurality of front wheels 54 and a plurality of rear wheels 56 rotatably attached to the swing hopper 50, a drive motor 60, a control unit 70 in communication with the drive motor 60, and at least one controller in communication with the control unit 70. The controller may be comprised of a manual controller and/or a remote controller. The user is able to pivot the swing hopper 50 with respect to a main auger 20 by using the remote controller while in the tractor or in a remote location away from the augers.

Various well known auger structures may be utilized to construct the main auger 20 that are capable of transporting particulate material (e.g. grain). The present invention is designed to be utilized upon various types of main augers 20 and should not be limited to the specific design of main auger 20.

The swing auger 40 is connected to the main auger 20 in a pivoting manner and may be comprised of any conventional swing auger 40 structure capable of transporting a particular material (e.g. grain).

A connecting chute 30 is attached to an end of the swing auger 40 opposite of the swing hopper 50. The connecting chute 30 is rotatably connected to a connecting boot 22 of the main auger 20 which is also well known in the art of augers. Various other connecting structures may be utilized to pivotally connect the swing auger 40 to the main auger 20 as can be appreciated and the present invention should not be limited to the structure shown in the drawings.

The swing hopper 50 is connected to the swing auger 40 and may be comprised of any conventional hopper structure capable of collecting the particulate material from beneath a hopper trailer and the like. The swing hopper 50 may include a screen 52 as is well known in the art of swing augers 40.

In the prior art, a pair of front wheels 54 and a pair of rear wheels 56 are rotatably attached to end walls 70 and 72 of the hopper which stand vertically upwardly and close the ends of the hopper. A hopper base wall 74 extends across between the ends and forms a trough for receiving the material to be transported. The trough includes feed augers for carrying the material to a transport auger flight in the swing auger tube to carry the material to the main auger.

Figure 4:
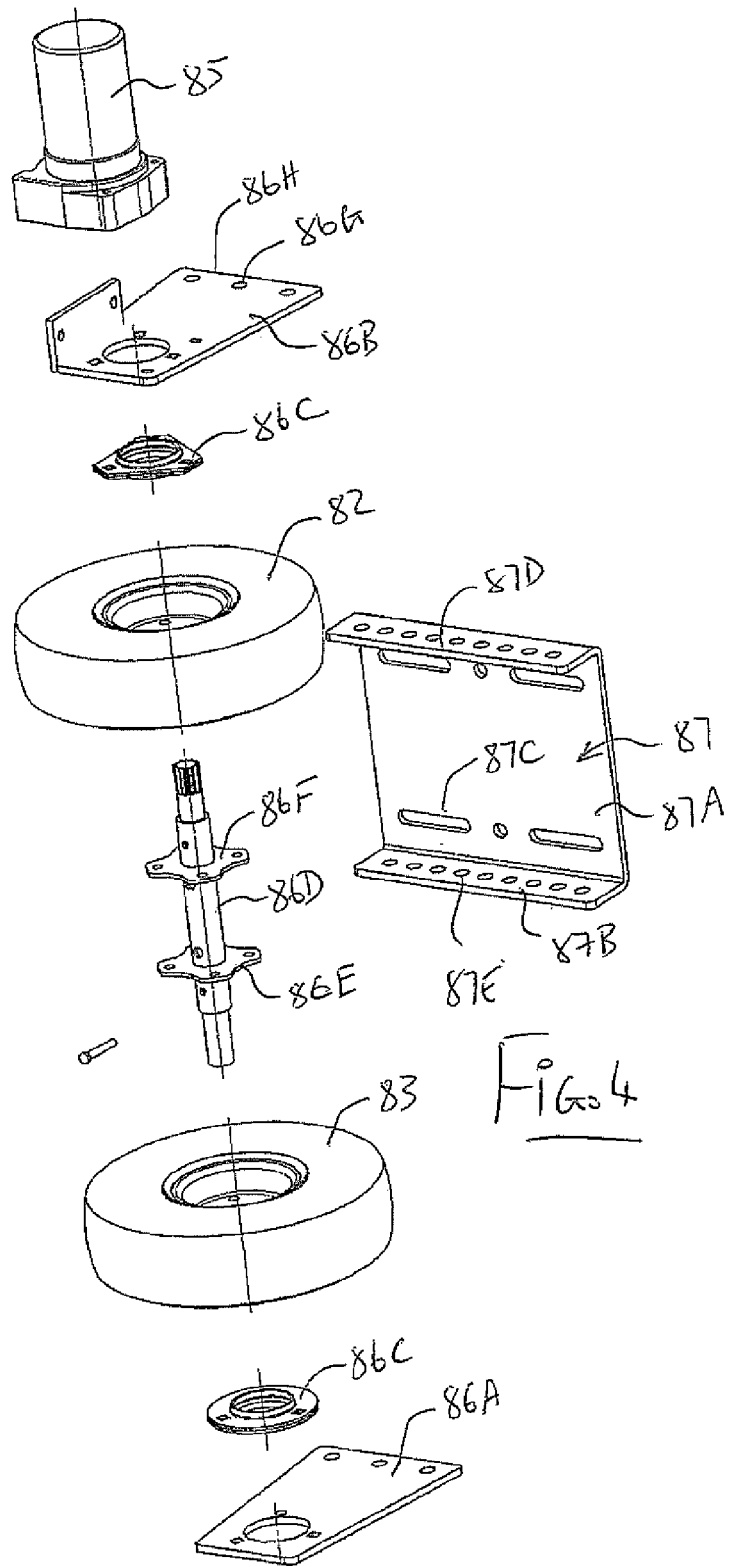
FIG. 4 is an exploded view of one of the drive assemblies of FIG. 2.

The arrangement of the present invention is shown in FIGS. 2, 3 and 4 where the base wall 74 includes a front inclined portion 75 and a rear inclined portion 76 where these portions are inclined upwardly and outwardly from a bottom apex 77 to side edges 71 and 73 of the hopper to confine the material. It will be appreciated that different models of hopper will have different shape of the base of the hopper but in all cases there is a base which is formed by two side walls converging to an apex so that the material is directed to a center feed auger 77A along the base.

In this arrangement at a position between the end walls there is provided a hopper drive assembly for moving the hopper in a direction parallel to the end walls and the wheels thereon. There may be provided non-driven wheels on the end walls or these may be omitted depending on the model.

The arrangement includes a first drive wheel assembly 80 mounted on the inclined wall 75 and a second drive wheel assembly 81 mounted on the inclined wall 76. Each assembly comprises a pair of wheels 82, 83 and a drive motor 85. The wheels are carried in a clevis 86 which includes two parallel plates 86A and 86B and may include a transverse web but in the embodiment shown there are only the two parallel plates. The plates 86A and 86B each carry bearings 86C for an axle 86D to which the wheels 82 and 83 are fixed by plates 86E and 86F. Thus the axle is carried in the bearings and can rotate in the bearings relative to the support plates 86A and 86B. The plate 86B provides a support for the body of the motor 85 with the motor having a rotor to which the end of the axle is attached. Thus the motor drives the pair of wheels between the two plates 86A and 86B which rotate to provide a driving action in contact with the ground. The clevis is in turn carried in a channel member 87 attached to the inclined wall 75, 76. The channel has a base 87A bolted to the inclined wall using holes 87C. The channel has two upstanding side flanges 87B and 87D which therefore extend at right angles to the inclined wall. The clevis defined by the plates 86A and 86B includes mounting holes 86G along the upper edge 86H which can be attached to the flanges 86D and 86F by holes 87E. Thus the clevis can be moved along the channel by selecting suitable ones of the holes so as to move the wheels along the inclined wall to adjust the height of the wheels relative to the hopper and relative to the wheels on the end walls.

A pair of wheels is used to provide sufficient traction since the main support wheels are un-driven.

The adjustment of the clevis carrying the wheels allows the attachment of the assembly to different arrangements of hopper as manufactured by different manufacturers where the angle of inclination and the distance from the ground will vary for different types of hopper.

The use of two different motors to drive the wheels allows the attachment readily without providing different mechanical connections between the wheels such as chains or the like which may need to be modified for different types of hopper.

The provision of the separate wheels rather than driving the wheels already present allows a simple mechanical attachment of the drive wheels without modification to the hopper itself Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An auger assembly comprising:
   a main auger;
   a swing auger connected to the main auger for pivotal swing movement about a generally upstanding axis of the main auger so that the swing auger can swing from a retracted position along side the main auger to an extended position at right angles to the main auger;
   a hopper connected to an outer end of said swing auger, the hopper having a pair of end walls and a base wall interconnecting the end walls and defining first and second side edges at right angles to the end walls;
   and a drive kit for attachment to the hopper for driving movement of the hopper comprising:
   a first drive assembly arranged for mounting on the base wall adjacent the first side edge of the hopper;
   and a second drive assembly arranged for mounting on the base wall adjacent the second side edge of the hopper;
   each drive assembly including at least one ground wheel and an electric drive motor for driving said at least one ground wheel about its axis so as to drive movement of the hopper.

2. The auger assembly according to claim 1 wherein the hopper has ground wheels on the swing hopper to allow the swing hopper to move over the ground.

3. The auger assembly according to claim 1 wherein each drive assembly includes a pair of drive wheels mounted for rotation about a common axis.

4. The auger assembly according to claim 1 wherein each drive assembly includes an adjustment allowing adjustment movement of the axis of the drive wheels in a direction toward and away from the respective side edge of the hopper.

5. The auger assembly according to claim 1 wherein the adjustment is provided by a mounting for the wheels and the drive motor which is movable relative to a bracket on the base of the hopper.

6. The auger assembly according to claim 5 wherein the mounting for the wheels and the drive motor comprises a pair of parallel mounting plates carrying bearings for the wheel and a support for the motor and wherein the bracket on the hopper is a channel in which the plates sit and along which the plates can be adjusted by selecting mounting holes.

7. The auger assembly according to claim 1 wherein there is provided a control unit in communication with said drive motors and a remote controller in communication with said control unit for controlling the operation of said drive motors.

8. The auger assembly according to claim 1 wherein there is only two drive assemblies each mounted in a respective side of a center line of the base of the hopper.

9. The auger assembly according to claim 1 wherein the base of the hopper includes two side wall portions converging downwardly and inwardly to an apex at a center line with the drive assemblies being adjustable on the side wall portions so as to move downwardly relative to the center line.

* * * * *